United States Patent
Behn

(10) Patent No.: US 10,864,790 B2
(45) Date of Patent: Dec. 15, 2020

(54) METHOD FOR PRODUCING A LINK MOUNTING ARRANGEMENT OF A MOTOR VEHICLE, AND MOUNTING ARRANGEMENT

(71) Applicant: VOLKSWAGEN AKTIENGESELLSCHAFT, Wolfsburg (DE)

(72) Inventor: Michael Behn, Ribbesbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/279,726

(22) Filed: Feb. 19, 2019

(65) Prior Publication Data
US 2019/0176555 A1 Jun. 13, 2019

Related U.S. Application Data

(63) Continuation of application No. PCT/EP2017/064461, filed on Jun. 13, 2017.

(30) Foreign Application Priority Data

Aug. 19, 2016 (DE) .......... 10 2016 215 623

(51) Int. Cl.
*B60G 7/02* (2006.01)
*B62D 17/00* (2006.01)

(52) U.S. Cl.
CPC ............ *B60G 7/02* (2013.01); *B60G 2200/46* (2013.01); *B60G 2200/4622* (2013.01);
(Continued)

(58) Field of Classification Search
CPC ...... B60G 7/02; B60G 7/008; B60G 2206/60; B60G 2206/601; B60G 2206/606;
(Continued)

(56) References Cited

U.S. PATENT DOCUMENTS 6,131,930 A  10/2000 Chalin
8,944,447 B2  2/2015 Khoury
(Continued)

FOREIGN PATENT DOCUMENTS

CN  201105621 Y  8/2008
CN  103978860 A  8/2014
(Continued)

OTHER PUBLICATIONS

International Search Report dated Sep. 8, 2017 in corresponding application No. PCT/EP2017/064461.

*Primary Examiner* — Keith J Frisby
(74) *Attorney, Agent, or Firm* — Muncy, Geissler, Olds & Lowe, P.C.

(57) ABSTRACT

A method for producing a mounting arrangement for a link of a motor vehicle suspension that is or can be pivotably mounted on a subframe of the motor vehicle, having the following steps: providing the subframe, which has a first and a second mounting flange for mounting the link; providing at least one intermediate product of a bracket; integrally joining the intermediate product to a mounting flange of the subframe by welding; forming an elongated hole in the intermediate product by punching of the same; and forming at least one stop on the intermediate product for an adjusting eccentric for chassis adjustment by stamping the intermediate product.

7 Claims, 5 Drawing Sheets

(52) U.S. Cl.
CPC .... *B60G 2204/143* (2013.01); *B60G 2204/42* (2013.01); *B60G 2204/4302* (2013.01); *B60G 2204/44* (2013.01); *B60G 2204/4404* (2013.01); *B60G 2204/61* (2013.01); *B60G 2206/60* (2013.01); *B60G 2206/601* (2013.01); *B60G 2206/606* (2013.01); *B60G 2206/8102* (2013.01); *B60G 2206/8201* (2013.01); *B62D 17/00* (2013.01)

(58) Field of Classification Search
CPC .... B60G 2206/8102; B60G 2206/8201; B60G 2204/143; B60G 2204/44; B60G 2204/4404; B60G 2204/4302; B60G 2204/61; B60G 2204/42; B60G 2200/462; B60G 2200/4622; B60G 2200/46; B62D 17/00
USPC ............. 280/124.134, 86.75, 86.754, 86.758
See application file for complete search history.

(56) References Cited

U.S. PATENT DOCUMENTS

| | | |
|---|---|---|
| 9,586,452 B2 | 3/2017 | Klaassen et al. |
| 2006/0181043 A1 | 8/2006 | Zebolsky |
| 2013/0147134 A1* | 6/2013 | Lee ..................... B60G 7/006 280/5.52 |
| 2016/0121676 A1 | 5/2016 | Drabon et al. |

FOREIGN PATENT DOCUMENTS

| | | |
|---|---|---|
| CN | 204077797 U | 1/2015 |
| DE | 102006046179 B4 | 4/2007 |
| DE | 102005052833 B4 | 5/2007 |
| DE | 102010055060 A1 | 6/2012 |
| DE | 102011084198 A1 | 4/2013 |
| DE | 102011121917 A1 | 6/2013 |
| DE | 102014116077 A1 | 5/2016 |
| EP | 0306626 A2 | 3/1989 |
| EP | 2910454 A1 | 8/2015 |
| JP | H0288315 A | 3/1990 |
| JP | H07257424 A | 10/1995 |

* cited by examiner

METHOD FOR PRODUCING A LINK MOUNTING ARRANGEMENT OF A MOTOR VEHICLE, AND MOUNTING ARRANGEMENT

This nonprovisional application is a continuation of International Application No. PCT/EP2017/064461, which was filed on June 13, and which claims priority to German Patent Application No. 10 2016 215 623.3, which was filed in Germany on Aug. 19, 2016, and which are both herein incorporated by reference.

BACKGROUND OF THE INVENTION

Field of the Invention

The present invention relates to a method for producing a mounting arrangement for a link of a motor vehicle suspension that is or can be pivotably mounted on a subframe of a motor vehicle and relates to a mounting arrangement for said link.

Description of the Background Art

It is generally known from the practice of motor vehicle manufacture to pivotably mount links of a suspension of a motor vehicle on a subframe of the same. In addition, it is known to provide adjusting devices by means of which it is possible to adjust the chassis with regard to toe-in and/or camber. Said toe-in is understood here to mean a certain a certain position of the left and right vehicle wheels relative to one another. Said camber is understood to mean the inclination of a vehicle wheel deviating from the vertical.

Thus, DE 10 2006 046 179 B4 describes an adjusting device for a motor vehicle suspension having a wheel control part that is articulated to a bearing bracket on the body side or on the wheel carrier side, wherein a screw passing through the bearing is carried in elongated holes of the bearing bracket and adjusting plates are provided that are located on the screw, the outer perimeter of which runs up against stops of the bearing bracket. The stops are formed as a single piece with the bearing bracket. The adjusting plates are centered relative to the center axis of the screw, and are spiral-shaped at their outer perimeter. By rotation of the adjusting plates, the screw can be moved in the elongated holes and, connected therewith, the wheel control part can be moved relative to the bearing bracket. DE 10 2011 084 198 A1 (which corresponds to U.S. Pat. No. 8,944,447) describes an axle adjustment for axles of utility vehicles comprising a frame unit, an eccentric element, and an adjusting unit. The eccentric element has a first contour by means of which one of the units (frame unit or adjusting unit) can be brought into engagement with the eccentric element. In addition, the eccentric element has a second contour by means of which the respective other unit can be brought into engagement with the eccentric element. The first contour is eccentrically arranged relative to the second contour of the eccentric element. By means of the second contour, the eccentric element bears against a fastening means or stop of the frame unit, said stop being formed as a single piece with the frame unit.

DE 10 2011 121 917 A1 describes a first bearing element in the form of a subframe of a motor vehicle; this subframe has an elongated hole in which a suspension link is adjustably mounted by means of a washer designed as an eccentric washer. The outer edge of the eccentric washer is in contact with a stop formed on the subframe. DE 10 2005 052 833 B4 discloses an eccentric arrangement for chassis adjustment, each eccentric of which bears against a U-shaped gate. The gates can each be formed on a leg of a U-shaped bearing bracket. Furthermore, the gates can also be attached to the said leg as separately manufactured components, for example by welding.

In addition, a separately manufactured bracket for attachment by welding to a mounting flange of a subframe of a motor vehicle is also known through prior public use, which bracket already has an elongated hole for adjustably accommodating a bearing bolt or a screw of the bearing of a suspension link as well as stops for an eccentric washer for the above-described chassis adjustment (toe-in and/or camber). In this context, however, welding distortions are encountered in practice after creation of the joint, which lead to increased tolerances between the elongated hole and the stops, which in turn result in greater measures to compensate for said tolerances. This is where the invention described below comes into play.

SUMMARY OF THE INVENTION

It is therefore an object of the present invention to provide a method for producing a link mounting arrangement by means of which the above-described disadvantages of the last-described prior art are avoided. An additional object of the invention is to create a mounting arrangement for said link.

The object is achieved in an exemplary embodiment by a method for producing a mounting arrangement for a link of a motor vehicle suspension that is or can be pivotably mounted on a subframe of the motor vehicle, having the following steps: (a) Providing the subframe, which has a first and a second mounting flange for mounting the link; (b) Providing at least one intermediate product of a bracket; (c) Integrally joining the intermediate product to a mounting flange of the subframe by welding; (d) Forming an elongated hole in the intermediate product by punching of the same, and (e) Forming at least one stop on the intermediate product for an adjusting eccentric for chassis adjustment by stamping the intermediate product.

Because of the circumstance that the mechanical processing of the said intermediate product to create the desired end product in the form of the bracket attached to the subframe by welding is now carried out after the joining step, any welding distortion that is observed is advantageously compensated for. As a result, it is possible to achieve high accuracy with regard to the arrangement of the at least one stop relative to the elongated hole, so that costly rework such as can occur in the prior art is rendered unnecessary.

According thereto, the steps d) and e) can be carried out in a single operation, resulting in a saving of production time, in particular. With regard to step b), preferably an intermediate product of the bracket is provided that is plate-like in design. "Plate-like" is understood here to mean a component or intermediate product of a nature such that it has a relatively small thickness in relation to its lengthwise and crosswise extents, and its crosswise extent or width does not differ very significantly from the length. Thus, the said intermediate product can be made, for example, of a simple and inexpensive-to-process metal sheet, and be punched with correct contours from a sheet metal blank. In order to meet certain stiffness requirements, the plate-like intermediate product that is provided can already have a bending at the edge. In order to optimize further processing of the intermediate product, provision is preferably made with regard to step b) that an intermediate product of the bracket is provided that has a prepunched hole, which advantageously can provide centering for a punching and stamping device. It is further preferred for provision to be made with regard to step e) that the at least one stop is created in the forming or stamping process by simple and inexpensive bending of a tab, which was made by free punching, on the said intermediate product. Finally, as the invention also provides, the steps d) and e) can be performed through an assembly opening in the applicable mounting flange, which opening advantageously ensures the necessary clearance for mechanical processing of the intermediate product by punching and stamping.

According thereto, the mounting arrangement for a link of a motor vehicle suspension that is or can be pivotably mounted on a subframe of the motor vehicle, having a subframe that has a first and a second mounting flange for mounting the link, is characterized in that an intermediate product of a bracket is integrally attached by welding to one of the mounting flanges, and as a result of at least one subsequent processing operation on the joined intermediate product, on the one hand an elongated hole is created by punching and on the other hand at least one stop for an associated adjusting eccentric is created for chassis adjustment. Advantageously, an assembly opening is formed in the applicable mounting flange for performing the subsequent processing operation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
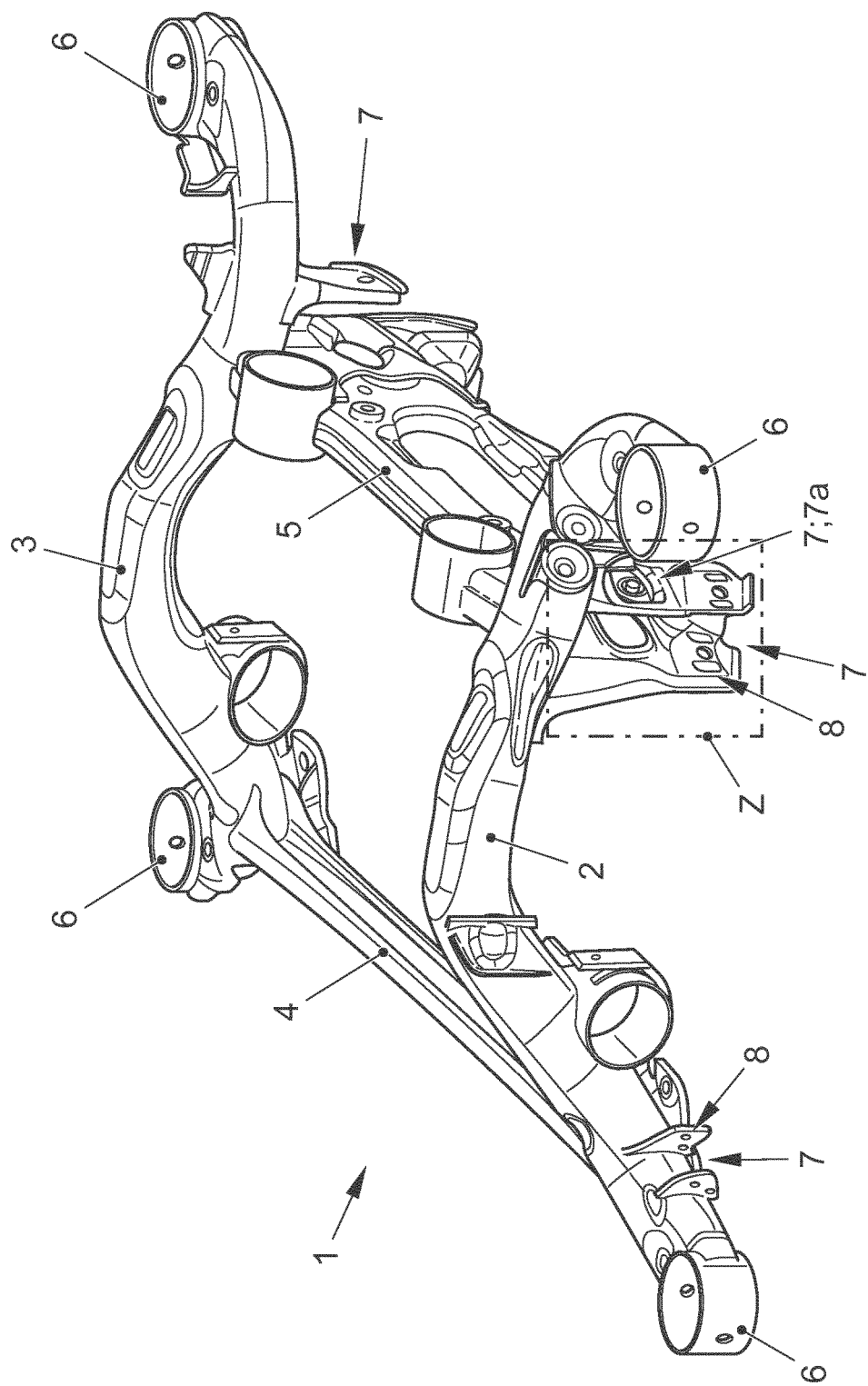
FIG. 1 is a perspective representation of a subframe of a motor vehicle with mounting points for various suspension links, wherein one of the mounting points has a mounting arrangement produced according to the method.

FIG. 1 shows, solely by way of example, a subframe 1 in the form of a rear subframe for a non-steerable axle of a motor vehicle. The subframe 1 is composed of two side pieces 2, 3 running in the vehicle's longitudinal direction (X-direction), which are connected to one another by means of a first, front cross member 4 and a second, rear cross member 5. At the ends of the side pieces 2, 3, the subframe 1 has hollow, cylindrical connecting pockets 6, which preferably serve to support and attach the subframe 1 to the vehicle body through the interposition of elastomer bearings (rubber-metal bearings).

In addition, the side pieces 2, 3 have various bolt-on or mounting points 7 with holes 8 for the attachment of links 9, including a tie rod 9a, of the suspension of a left and right vehicle wheel. In the following, the invention is described by way of example on the basis of a link 9 in the form of said tie rod 9a.

Figure 2:
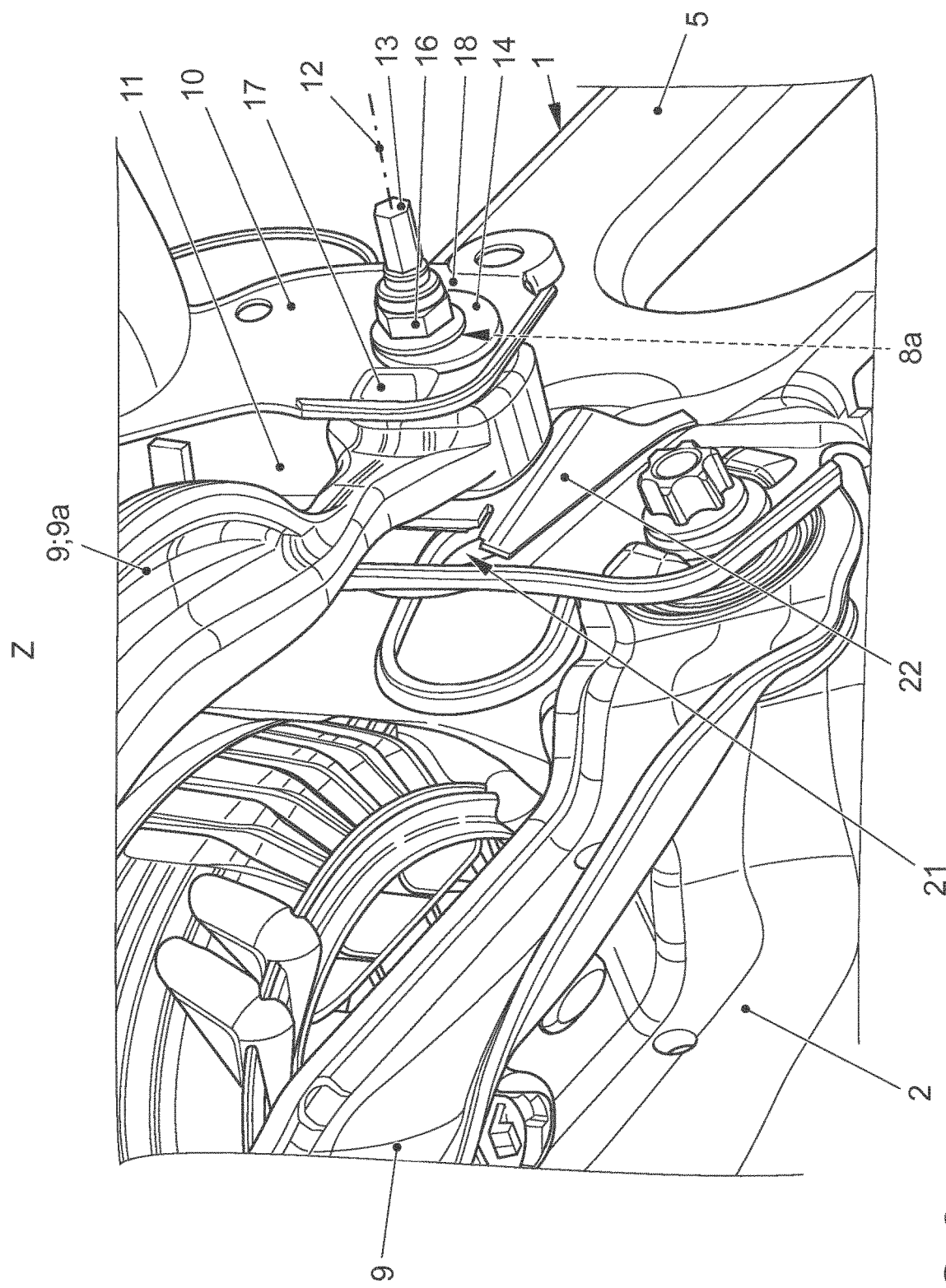
FIG. 2 is a perspective detail view of the subframe mounting arrangement from FIG. 1 that was produced according to the method for a link that forms a tie rod (detail "Z" from FIG. 1)
Figure 7:
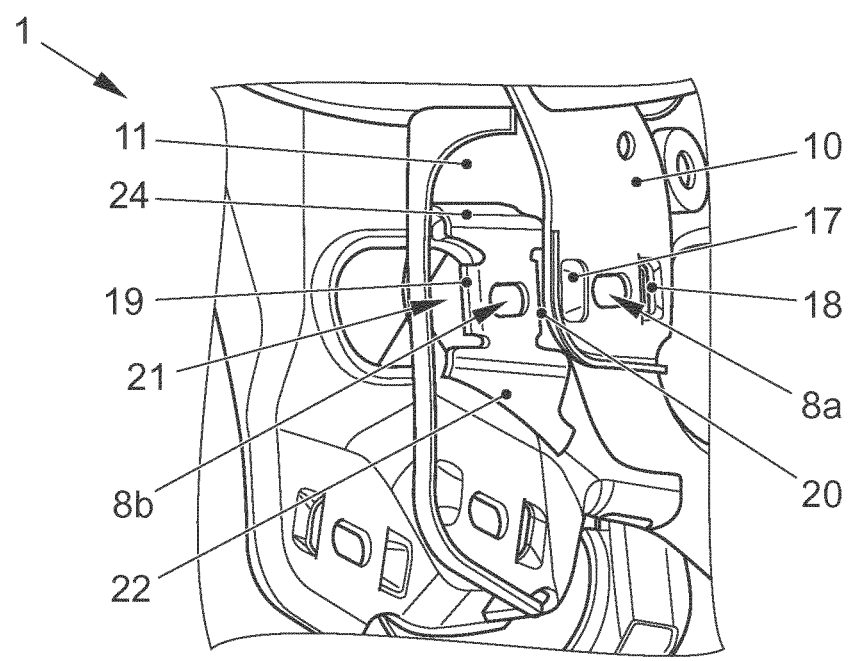
FIG. 7, with respect to the processing state of the intermediate product/of the bracket from FIG. 6, shows an additional, perspective view of the said mounting arrangement.

The mounting point 7a for said tie rod 9a is composed of a first and a second mounting flange 10, 11 of the subframe 1, which mounting flanges 10, 11 run parallel to one another (see especially FIGS. 1, 2, and 7). In the mounting flanges 10, 11, the tie rod 9a is pivotably mounted by a rubber-metal sleeve bearing. At its end, opposite the mounting point 7a, the tie rod 9a is articulated to a wheel carrier of the suspension. For chassis adjustment, wheel control parameters, such as toe-in and camber, can be altered by displacement of the pivot axis 12 of the tie rod 9a relative to the mounting flanges 10, 11 of the subframe 1 that form the mounting point 7a.

Figure 3:
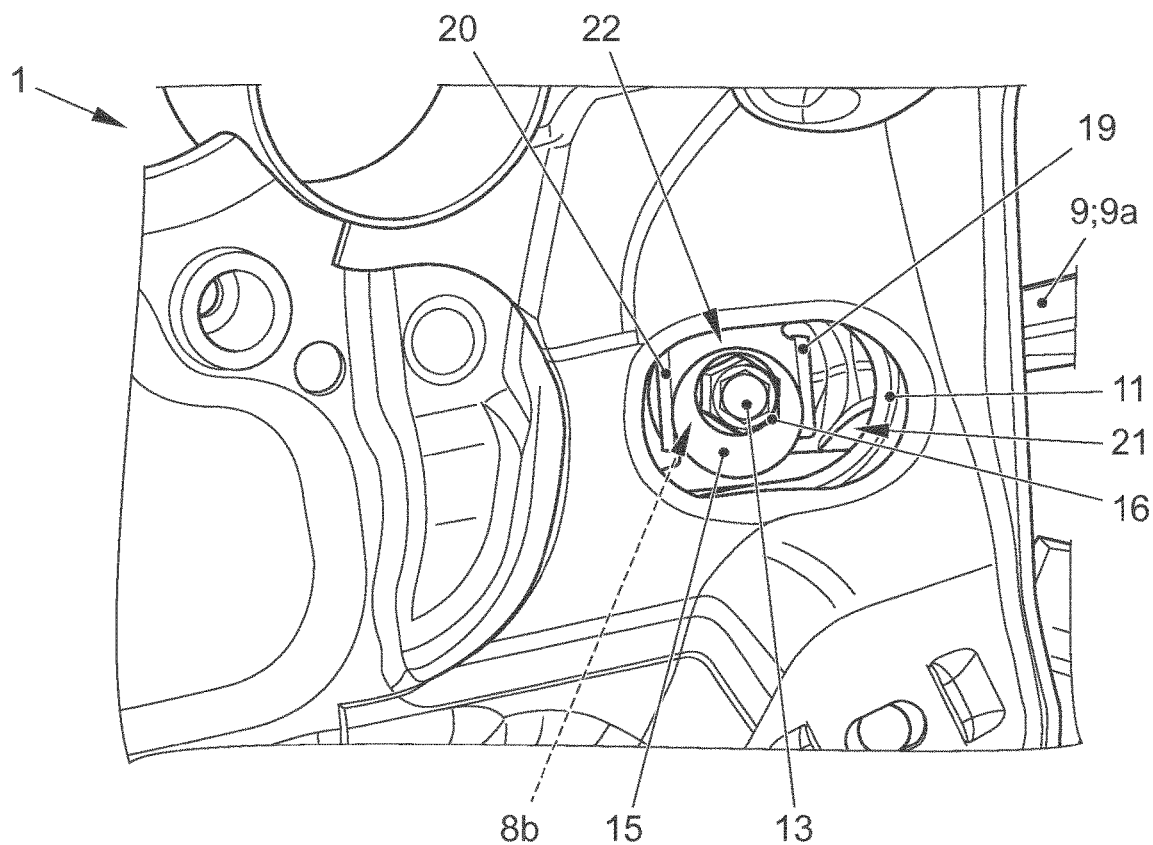
FIG. 3 is another view of said detail "Z"

For this purpose, a first and a second adjusting eccentric 14, 15 are associated with a bearing bolt 13 that passes through the rubber-metal sleeve bearing (see especially FIGS. 2 and 3). The bearing bolt 13 is movably carried in elongated holes 8a, 8b associated with the mounting flanges 10, 11, and can be fixed in the desired position relative to the mounting flanges 10, 11 by means of nut 16. At both ends of the elongated holes 8a, 8b, one stop 17, 18; 19, 20 apiece is associated with the adjusting eccentrics 14, 15.

According to this exemplary embodiment, an elongated hole 8a is made directly through the first mounting flange 10. This mounting flange 10 simultaneously forms, as a single piece, said stops 17, 18 for the first adjusting eccentric 14 (see especially FIGS. 2 and 7). The other, second mounting flange 11, in contrast, forms an assembly opening 21 in the relevant region (see especially FIG. 2, 3, 5-7).

Extending across said assembly opening 21 is a bracket 22 that is permanently attached to the applicable mounting flange 11 and that itself forms an elongated hole 8b and the stops 19, 20 for the second adjusting eccentric 15. The bracket 22 is integrally connected to the second mounting flange 11 of the subframe 1 by welding.

The process steps described below for forming the mounting arrangement achieved by the bracket 22 are favored for the purpose of counteracting the welding distortion that causes increased tolerances as described at the outset and that has an adverse effect in the prior art on the dimensional accuracy of the elongated hole 8b and the stops 19, 20 of the bracket 22, as well as on the arrangement of the same.

Figure 4:
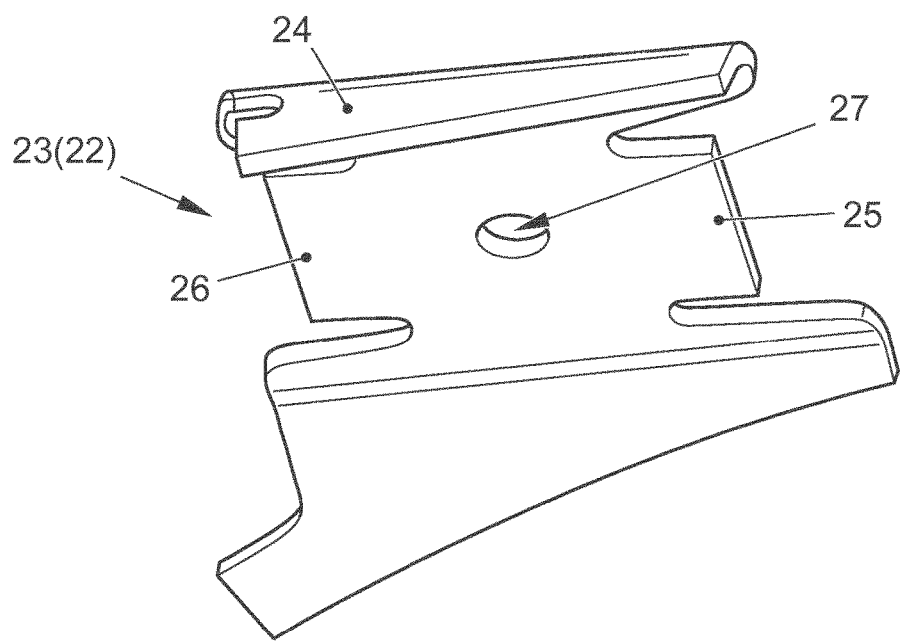
FIG. 4 is an intermediate product that is essential for the method according to the invention in a detail view.
Figure 5:
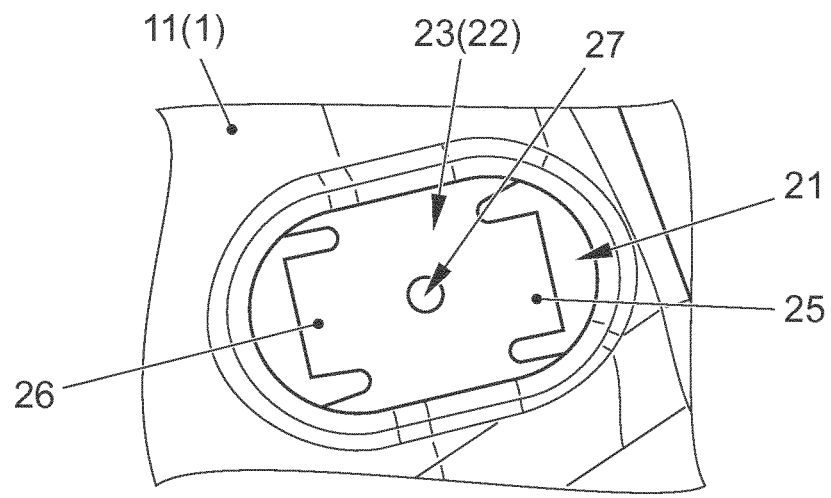
FIG. 5 is a depiction of the subframe with a view through an assembly opening showing the intermediate product welded to the subframe.
Figure 6:
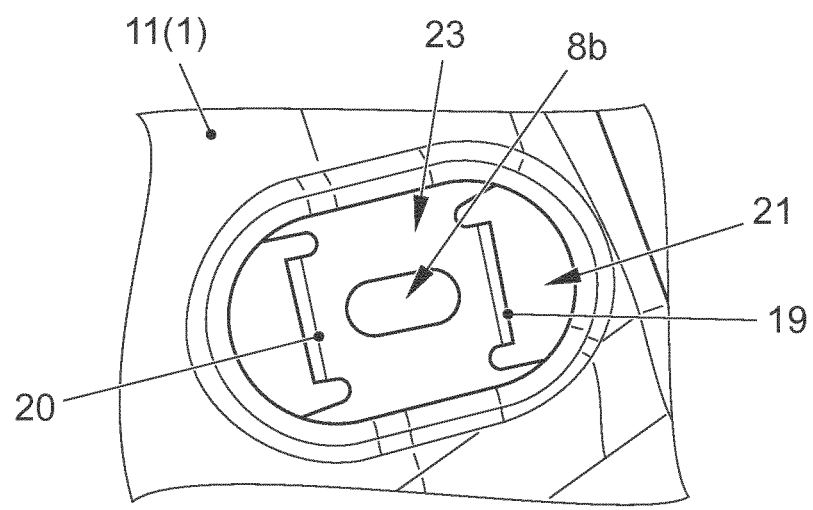
FIG. 6 illustrates the view from FIG. 5 with the intermediate product in a state in which the same has experienced, subsequent to the welding process, a mechanical processing by punching and forming or stamping to create a finished bracket for mounting the link on the subframe and for receiving an adjusting eccentric for chassis adjustment of the motor vehicle.

According thereto, provision is made that first an intermediate product 23 or semifinished product of the bracket 22 is provided that is permanently attached, by welding, to the second mounting flange 11 of the likewise provided subframe 1. As shown in FIGS. 4 and 5, the said intermediate product 23 is substantially plate-like in design and has, according to this exemplary embodiment, a bending 24 at the edge that serves, in particular, to stiffen the intermediate product 23. The intermediate product 23 preferably is punched with correct contours from a sheet metal blank and provided with said bending 24 in a single operation. The intermediate product 23 additionally has two opposing tabs 25, 26 that were made by free punching, as well as a so-called prepunched hole 27 located in a region between them.

The process of joining by welding is followed by a punching and stamping process. The two last-mentioned processes are preferably carried out in a single operation by means of a punching and stamping device that engages the intermediate product 23 through the assembly opening 21 and processes it. The prepunched hole 27 advantageously provides centering for the punching and stamping device.

The said elongated hole 8b is made in the intermediate product 23 by the punching process. The stamping process achieves the formation of the stops 19, 20, by the means that the tabs 25, 26 that were made by free punching are bent—in this exemplary embodiment—orthogonally to the plane of the intermediate product 23, in the present case toward the assembly opening 21 (see especially FIGS. 2, 3, 6, and 7).

The above exemplary embodiment focuses on just one mounting arrangement produced in accordance with the invention based on a link 9 in the form of a tie rod 9a and also with the aid of an intermediate product 23. It is a matter of course that it is also possible to provide two such mounting arrangements for each mounting point 7a, each of which is formed by a welded-on intermediate product 23 that subsequently experiences said mechanical processing of the above-described nature. Furthermore, the invention is not limited to said tie rod 9a, but instead includes any link 9 pivotably mounted on the subframe whose mounting may, if applicable, be intended to have an adjustment of the above-described type.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for producing a mounting arrangement for a link of a motor vehicle suspension that is adapted to be pivotably mounted on a subframe of the motor vehicle, the method comprising:
    providing the subframe, which has a first and a second mounting flange for mounting the link;
    providing at least one intermediate product of a bracket;
    integrally joining the intermediate product to a mounting flange of the subframe by welding;
    forming an elongated hole in the intermediate product by punching of the same; and
    forming at least one stop on the intermediate product for an adjusting eccentric for chassis adjustment by stamping the intermediate product.

2. The method according to claim 1, wherein steps of forming the elongated hole and forming at least one stop are carried out in a single operation.

3. The method according to claim 1, wherein the intermediate product of the bracket is plate-like in design.

4. The method according to claim 3, wherein the plate-like intermediate product has at least one bending at an edge to stiffen the intermediate product.

5. The method according to claim 1, wherein the intermediate product of the bracket has a prepunched hole.

6. The method according to claim 1, wherein the at least one stop is created in a stamping process by bending a tab that was made by free punching on the said intermediate product.

7. The method according to claim 1, wherein the steps of forming the elongated hole and stop are performed through an assembly opening in an applicable mounting flange.

* * * * *